J. S. GREENE.
PHOTOGRAPHIC ROLL HOLDER.
APPLICATION FILED JUNE 25, 1914.

1,204,011.

Patented Nov. 7, 1916.

Witnesses
Nelson H. Copp
Russell B. Griffiths

Inventor
John S. Greene
By Church & Rich
his Attorneys

UNITED STATES PATENT OFFICE.

JOHN S. GREENE, OF ROCHESTER, NEW YORK, ASSIGNOR TO COMMERCIAL CAMERA COMPANY, OF PROVIDENCE, RHODE ISLAND, A CORPORATION OF RHODE ISLAND.

PHOTOGRAPHIC-ROLL HOLDER.

1,204,011.  Specification of Letters Patent.  Patented Nov. 7, 1916.

Application filed June 25, 1914. Serial No. 847,329.

*To all whom it may concern:*

Be it known that I, JOHN S. GREENE, of Rochester, in the county of Monroe and State of New York, have invented certain new and useful Improvements in Photographic-Roll Holders; and I do hereby declare the following to be a full, clear, and exact description of the same, reference being had to the accompanying drawings, forming a part of this specification, and to the reference-numerals marked thereon.

My present invention relates to photography and more particularly to photographic cameras of the type known as commercial or copying cameras in which the negative exposures are recorded direct upon a sensitized paper web of considerable width that is wound in a large roll of greater weight than that of the usual film camera and drawn off as required for each exposure, being thereafter cut, developed, fixed and delivered as the finished copy or picture without the step of reversing to a positive by contact printing. As stated, these rolls are of greater bulk than those of other types of cameras and an object of the invention is to provide a roll holder for copying cameras in which provision shall be made for conveniently inserting the roll in its holder and for revolubly supporting it in such a manner as to permit it to feed off with ease and yet with just sufficient uniform resistance to prevent it from overrunning and to keep the paper flat and taut.

A further and important object of the invention is to provide a construction in which there shall be no possibility of the roll binding as a result of the expansion or contraction thereof or of the core or spool on which it is wound from atmospheric or climatic conditions.

To these and other ends the invention consists of certain improvements and combinations of parts, all as will be hereinafter more fully explained, the novel features being pointed out in the claim at the end of the specification.

Figure 1:
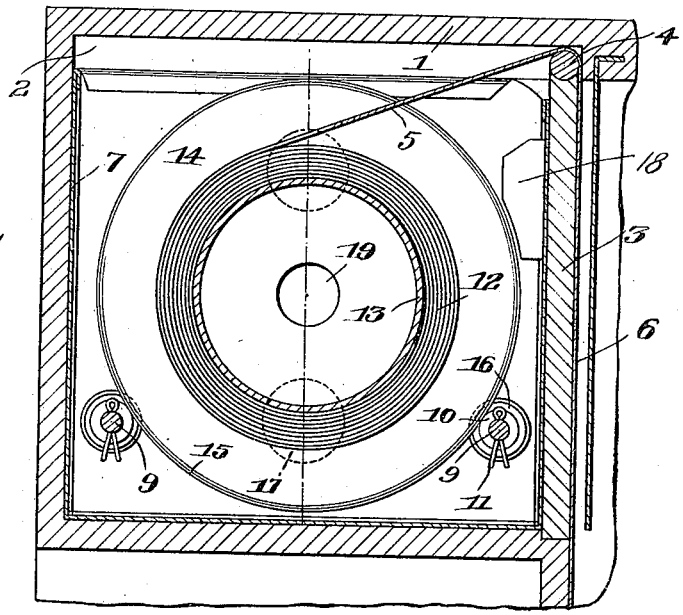
Figure 2:
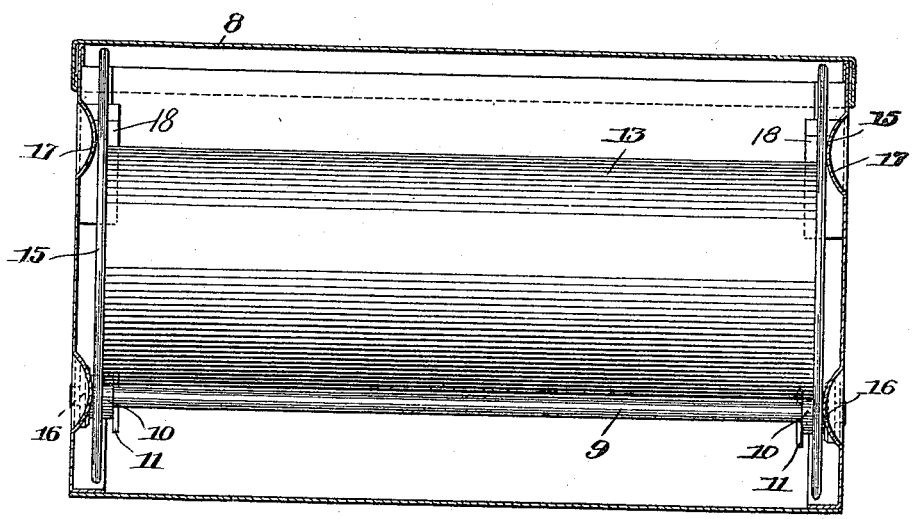

In the drawings: Figure 1 is a fragmentary section through the film or paper feeding compartment of a copying camera showing, in transverse section, a roll holder constructed in accordance with and illustrating one embodiment of my invention; Fig. 2 is a longitudinal section through the roll box or casing showing the roll in side elevation.

Similar reference numerals in the several figures indicate the same parts.

The roll holder of the present invention is adapted for use, and has been illustrated, in connection with a camera of the general type shown in the patent to G. S. Dey, No. 1,057,412, dated April 1, 1913. For present purposes reference need be made merely to the fact that such a camera comprises a casing 1 inclosing a horizontally disposed film feeding chamber 2, disposed transversely of the camera and access to which is gained from the front side through a side wall 3 which is removable in the nature of a door. The latter has a roller 4 at the top over which the film or paper web is drawn by means described in the said Dey patent, and the door acts as part of a focal plane support for that portion 6 of the film which is in position for exposure.

In the practice of my present invention I provide a roll holder comprising a box or casing 7, preferably of sheet metal, which, before insertion in the camera is closed and protected by a cover 8, shown in Fig. 2. This box is inserted through the door 3 and closely fits the chamber 2. Extending longitudinally thereof near the bottom are two parallel supporting rods 9 and at each end of each rod close to the end walls is a loose roller 10 held in position by a cotter pin 11.

The film or paper web 5 is wound in a roll 12 upon the preferably hollow core or drum 13 of a large spool having end flanges 14. The latter are preferably composed of metal with rolled edges 15 and the spool rests upon the supporting rods 9 with these edges or rims of its flanges in contact with the rollers 10. The rods are so positioned as to keep the flanges out of contact with the bottom and side walls of the box and in addition to flanges 16 on the rollers 10 the end walls of the box 7 may be provided with protuberances 17 formed out from the material thereof to keep the end flanges of the spool from scraping against the end walls except along a restricted area. Thus, as the film 5 is drawn off from the roll 12 the spool is rotated, not on a central support but upon its periphery, the rims 15 running upon the rollers 9. Of course the tendency of the film is to lift the roll if the rotary movement is not entirely free, but bumpers 18 prevent it from rising too far when depleted and when the roll is large its weight is sufficient to hold it down and cause it to bear down against its support with sufficient pressure to give a degree of frictional resistance that will prevent the film from overrunning. In other words, the spool will have no tendency to spin as is the case with a spool supported on a central shaft when given an unwinding impulse at or near its periphery, and no friction retaining springs such as have been previously employed are required.

The spool may be made entirely of metal or it may have a stiff paper core 13 and even paper or wooden ends 14. In any event, the spool adapts itself to an easy position on the rods and its uniformity of movement is not hampered, should it become warped or bulged at any point liable to suffer effects from atmospheric changes. The spool is easily placed in position within the box for all that it is necessary to do is to drop it in and correspondingly, to tilt the box to remove it. The end flanges 14 may be provided with central openings 19 to receive a shaft or rod for manipulation outside of the box as when winding the film thereon in the first instance.

I claim as my invention:

In a roll holder for photographic cameras, the combination with a box or casing of two relatively spaced flanged rollers arranged therein at each end near the bottom thereof, a film spool arranged in the casing and having the rims or edges of its end flanges resting upon the rollers to revolubly sustain a roll of film wound on the spool by revolving against the rollers as the film is drawn off, said rollers being so arranged as to position the spool with its flanges out of contact with the bottom wall and the two side walls of the casing and protuberances on the end walls of the casing engaging the end faces of the flanges of the spools to hold them in position on the rollers.

JOHN S. GREENE.

Witnesses:
 RUSSELL B. GRIFFITH,
 H. E. STONEBRAKER.

Copies of this patent may be obtained for five cents each, by addressing the "Commissioner of Patents, Washington, D. C."